US011216724B2

(12) United States Patent
Lopatka et al.

(10) Patent No.: US 11,216,724 B2
(45) Date of Patent: Jan. 4, 2022

(54) ACOUSTIC EVENT DETECTION BASED ON MODELLING OF SEQUENCE OF EVENT SUBPARTS

(71) Applicant: INTEL CORPORATION, Santa Clara, CA (US)

(72) Inventors: Kuba Lopatka, Gdansk (PL); Tobias Bocklet, Munich (DE); Mateusz Kotarski, Sopot (PL)

(73) Assignee: INTEL CORPORATION, Santa Clara, CA (US)

( * ) Notice: Subject to any disclaimer, the term of this patent is extended or adjusted under 35 U.S.C. 154(b) by 1033 days.

(21) Appl. No.: 15/834,838

(22) Filed: Dec. 7, 2017

(65) Prior Publication Data

US 2019/0042881 A1 Feb. 7, 2019

(51) Int. Cl.
*G06N 3/08* (2006.01)
*G06K 9/62* (2006.01)
(Continued)

(52) U.S. Cl.
CPC ............ *G06N 3/08* (2013.01); *G06F 16/683* (2019.01); *G06K 9/6223* (2013.01);
(Continued)

(58) Field of Classification Search
CPC .. G06K 9/6223; G06K 9/6217; G06F 16/683; G06F 17/18; G06N 3/088; G06N 20/10;
(Continued)

(56) References Cited

U.S. PATENT DOCUMENTS 6,711,536 B2 * 3/2004 Rees ................... G10L 15/04
704/210
6,980,956 B1 * 12/2005 Takagi .................. G06N 3/004
700/250

(Continued)

OTHER PUBLICATIONS

Murugaboopathy, Dr. G. et al.; Classification Study of Sound and Image Events Using Event Detection; IJECS vol. 05 Issue 2 Feb. 2016 p. 15700-15713. (Year: 2016).*

(Continued)

*Primary Examiner* — Stanley K. Hill
(74) *Attorney, Agent, or Firm* — Hanley, Flight & Zimmerman, LLC (57) ABSTRACT

Techniques are provided for acoustic event detection. A methodology implementing the techniques according to an embodiment includes extracting acoustic features from a received audio signal. The acoustic features may include, for example, one or more short-term Fourier transform frames, or other spectral energy characteristics, of the audio signal. The method also includes applying a trained classifier to the extracted acoustic features to identify and label acoustic event subparts of the audio signal and to generate scores associated with the subparts. The method further includes performing sequence decoding of the acoustic event subparts and associated scores to detect target acoustic events of interest based on the scores and temporal ordering sequence of the event subparts. The classifier is trained on acoustic event subparts that are generated through unsupervised subspace clustering techniques applied to training data that includes target acoustic events.

8 Claims, 8 Drawing Sheets

(51) Int. Cl.

| | |
|---|---|
| *G06F 16/683* | (2019.01) |
| *G10L 25/51* | (2013.01) |
| *G06N 20/10* | (2019.01) |
| *G10L 25/18* | (2013.01) |
| *G06N 3/04* | (2006.01) |
| *G06N 7/00* | (2006.01) |

(52) U.S. Cl.
CPC ........... *G06N 3/0445* (2013.01); *G06N 3/088* (2013.01); *G06N 7/005* (2013.01); *G06N 20/10* (2019.01); *G10L 25/18* (2013.01); *G10L 25/51* (2013.01)

(58) Field of Classification Search
CPC ...... G06N 3/0445; G06N 7/005; G10L 25/24; G10L 25/18; G10L 25/51
See application file for complete search history.

(56) References Cited

U.S. PATENT DOCUMENTS

| | | | | |
|---|---|---|---|---|
| 9,378,733 | B1* | 6/2016 | Vanhoucke | G10L 15/02 |
| 10,043,521 | B2* | 8/2018 | Bocklet | G10L 17/02 |
| 10,141,009 | B2* | 11/2018 | Khoury | G10L 25/78 |
| 2002/0038294 | A1* | 3/2002 | Matsugu | G06N 3/063 706/20 |
| 2012/0010736 | A1 | 1/2012 | Cardillo | H04N 21/4394 700/94 |
| 2012/0032705 | A1* | 2/2012 | Boulanger | G01S 13/784 327/2 |
| 2015/0094835 | A1* | 4/2015 | Eronen | G06F 3/165 700/94 |
| 2015/0127594 | A1* | 5/2015 | Parada San Martin | G06N 3/0454 706/16 |
| 2015/0142707 | A1* | 5/2015 | Charif | G06N 20/00 706/12 |
| 2015/0242754 | A1* | 8/2015 | Fukuda | G06K 9/6265 706/12 |
| 2015/0279351 | A1* | 10/2015 | Nguyen | G10L 15/08 704/251 |
| 2015/0339570 | A1* | 11/2015 | Scheffler | G06N 3/04 706/16 |
| 2016/0180838 | A1* | 6/2016 | Parada San Martin | G06N 3/02 704/232 |
| 2016/0284349 | A1* | 9/2016 | Ravindran | G10L 15/20 |
| 2017/0148444 | A1 | 5/2017 | Bocklet et al. | |
| 2017/0372725 | A1* | 12/2017 | Khoury | G10L 25/78 |
| 2018/0191758 | A1* | 7/2018 | Abbaszadeh | H04L 63/1441 |

OTHER PUBLICATIONS

Mesaros, Annamaria et al.; Detection and Classification of Acoustic Scenes and Events: Outcome of the DCASE 2016 Challenge; IEEE/ACM Transactions on Audio, Speech, and Language Processing, vol. 26, No. 2, Feb. 2018; pp. 379-393. (Year: 2018).*

Xia, Xianjun et al.; Frame-wise dynamic threshold based polyphonic acoustic event detection; 2017 ISCA; INTERSPEECH 2017; pp. 473-478. (Year: 2017).*

Adavanne, Sharath et al.; A Report on Sound Event Detection With Different Binaural Features; Detection and Classification of Acoustic Scenes and Events 2017; 4 pages. (Year: 2017).*

Cao, F. et al., "Density-Based Clustering over an Evolving Data Stream with Noise", 2006, Proceedings of the 2006 SIAM International Conference on Data Mining, 12 pages.

Gencoglu, O. et al., "Recognition of acoustic events using deep neural networks", 2014, 22nd European Signal Processing Conference, 5 pages.

Hazen, Timothy J., "Automatic alignment and error correction of human generated transcripts for long speech recordings", 2006, Interspeech, 4 pages.

He, X. et al., "Laplacian Regularized Gaussian Mixture Model for Data Clustering", Sep. 2011, IEEE Transactions on Knowledge and Data Engineering,vol. 23, 13 pages.

Jansen, A. et al., "Large-scale audio event discovery in one million YouTube videos", Int. Conf. on Acoustics, Speech and Signal Proc., 2017, 5 pages.

MacQueen, J. B., "Some Methods for classification and Analysis of Multivariate Observations", 1967, Proceedings of 5th Berkeley Symposium on Mathematical Statistics and Probability, 17 pages.

Pancoast, Stephanie and Murat Akbacak, "Bag-of-Audio-Words Approach for Multimedia Event Classification", 2012, Interspeech, 5 pages.

Takahashi, N. et al., "Deep Convolutional Neural Networks and Data Augmentation for Acoustic Event Detection", 2016. Interspeech, 5 pages.

* cited by examiner

ACOUSTIC EVENT DETECTION BASED ON MODELLING OF SEQUENCE OF EVENT SUBPARTS

BACKGROUND

Acoustic event detection is playing an increasingly important role in applications related to the Internet of Things (IoT), smart home technologies, and digital surveillance systems. It is often useful for a detection/recognition system to be able to react to selected acoustic events of interest, such as, for example, a gunshot, breaking glass, a crying baby, or other sounds indicative of a situation that may require the attention of the interested party. Existing recognition systems typically need to be trained on acoustic training data sequences that contain the event type of interest. These events need to be labeled and their location within the data sequence must be provided, which is typically a time-consuming and expensive task. Additionally, these existing systems often do not provide the desired level of accuracy, for example in terms of detection rate and false alarm rate, which can be required for some of these applications.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for acoustic event detection based on the modeling of a sequence of subparts of the event of interest. Acoustic events are typically composed of a number of sequential subparts, each of which can possess distinctive and recognizable characteristics. As will be appreciated in light of this disclosure, the number of subparts can vary from case to case, but generally includes two or more distinct and distinguishable subparts. For example, the sound of breaking glass may include a sharp impulsive sound associated with the initial fracture, followed by a crackling sound as the break spreads throughout the glass, followed by yet a third different sound as the pieces crumble and settle onto the surrounding area. Any number of other such multi-part sound events will be apparent in light of this disclosure. The techniques generally include a training phase and an inferencing or application phase, and can be implemented, for example, in a computing system or a software product executable or otherwise controllable by such systems, although other embodiments will be apparent. The system or product is configured to detect one or more acoustic events of interest (e.g., targeted acoustic events) that may occur within a given overall audio signal. Note that the overall audio signal itself may include one or more actual acoustic events, each including a number of subparts.

In accordance with an embodiment, a classifier is trained to identify and score each of the acoustic subparts of events of interest. The classifier may be, for example, a deep neural network. The trained classifier is subsequently applied to acoustic features that are extracted from a signal that is provided for analysis, and a sequence of subpart scores are inferred or otherwise generated. As previously noted, the acoustic features may include short-term Fourier transforms, or any other spectral energy characteristics of the audio signal. A sequence decoder then performs sequence decoding of the acoustic event subparts and associated scores to recognize the proper temporal sequence of these subparts, from which an event detection may be determined. Because the classifier effectively models the distinctive characteristics of multiple subparts of a given sound event, rather than trying to recognize the event in its entirety, event detection performance is improved (e.g., fewer false or incorrect detections). Additionally, because the sequence decoding imposes a temporal order on the subparts, the detection performance is more reliable and robust.

In some such embodiments, the classifier is trained on acoustic event subparts that are generated through unsupervised subspace clustering techniques applied to training data that includes target acoustic events, as will be explained in greater detail below. The use of unsupervised subspace clustering techniques provides an additional benefit, in that the training data does not need to be annotated with the starting and stopping points of the acoustic events, as will also be explained below. This benefit allows for more efficient and cost-effective generation of training data.

As will be appreciated, the techniques described herein allow for improved acoustic event detection based on the modelling of event subparts with a finer level of granularity, which improves the discriminative power of the classifier, compared to existing systems that attempt to recognize the entirety of the event. The disclosed techniques can be implemented on a broad range of platforms including laptops, tablets, smart phones, workstations, embedded systems or devices. These techniques may be particularly suitable for use on digital signal processors (DSPs), or other dedicated ultra-low power hardware. These techniques may further be implemented in hardware or software or a combination thereof.

Figure 1:
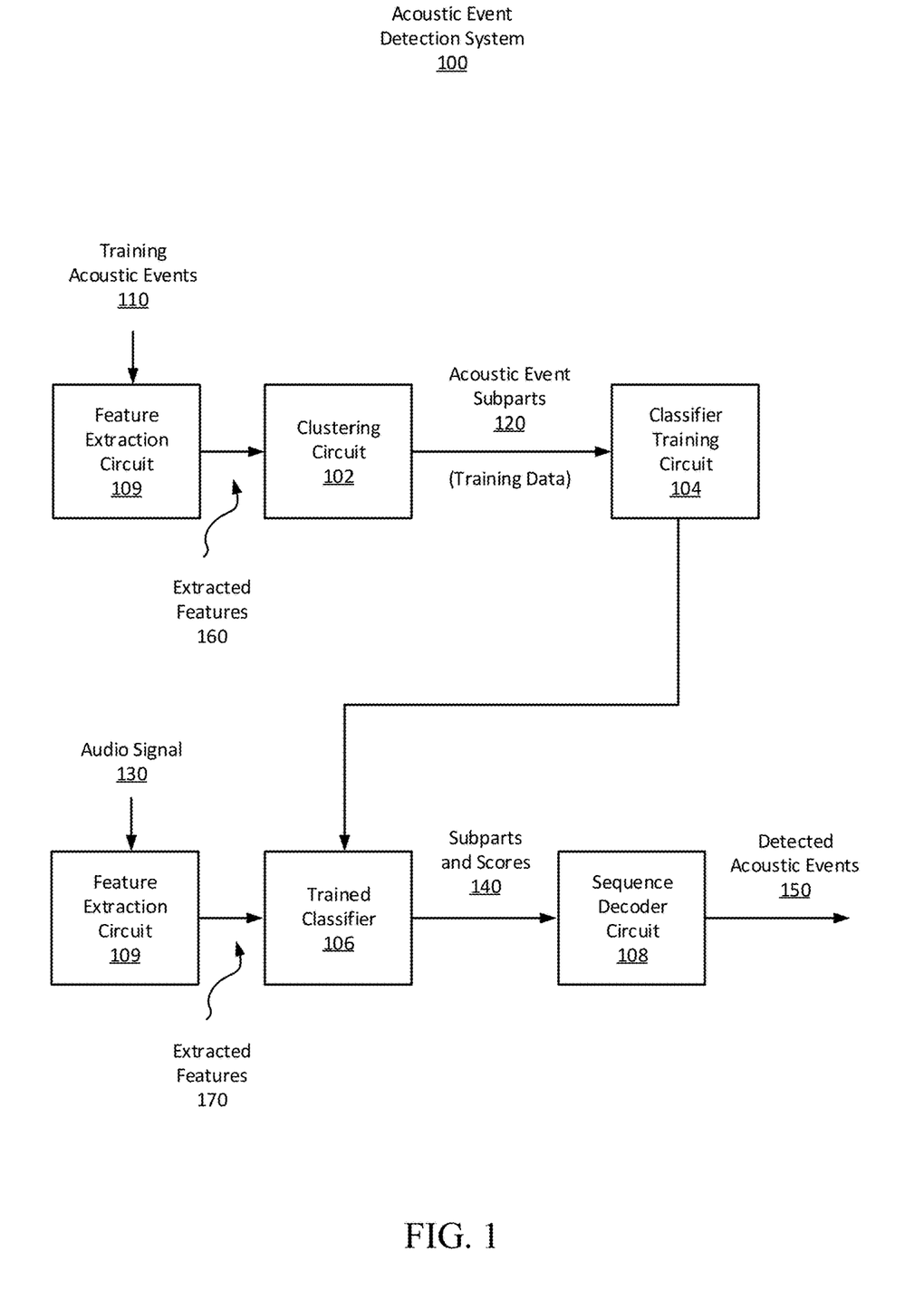
FIG. 1 is a top-level block diagram of an acoustic event detection system, configured in accordance with certain embodiments of the present disclosure.

FIG. 1 is a top-level block diagram of an acoustic event detection system 100, configured in accordance with certain embodiments of the present disclosure. The system 100 is shown to include a feature extraction circuit 109, a clustering circuit 102, a classifier training circuit 104, a trained classifier 106, and a sequence decoder circuit 108. At a high level, the acoustic event detection system 100 receives training data 110, containing targeted acoustic events, and performs classifier training on subparts 120 of those events, using unsupervised subspace clustering, as will be explained in greater detail below. The trained classifier 106 may then be employed in an operational mode to detect acoustic events of interest (e.g., the targeted events) in a received audio signal 130, based on the clustered subparts. Feature extraction circuit 109, clustering circuit 102, and classifier training circuit 104 are employed in the training mode of the acoustic event detection system 100. Feature extraction circuit 109, trained classifier 106, and sequence decoder circuit 108 are employed in the operational mode of the acoustic event detection system 100.

Figure 3:
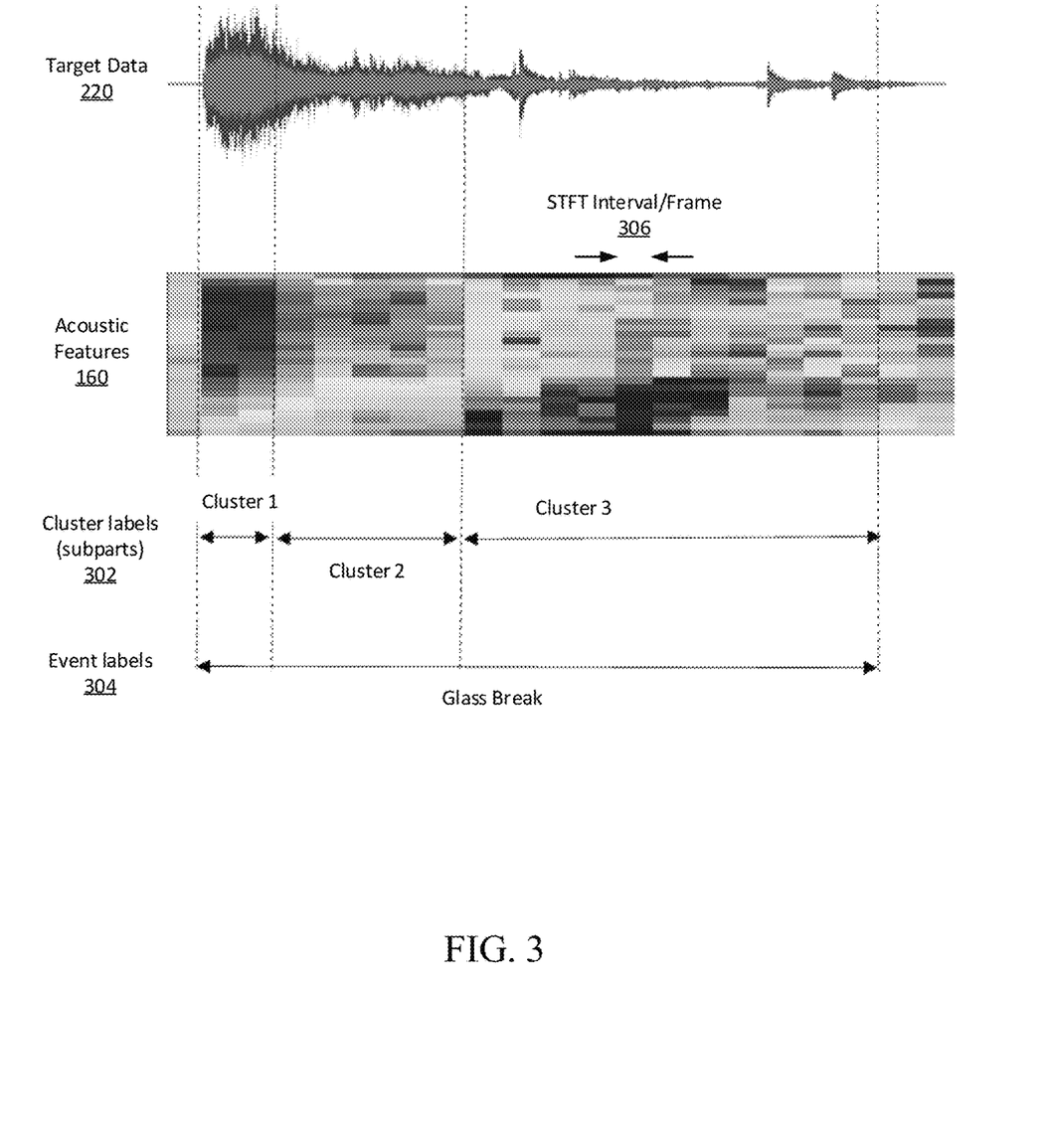
FIG. 3 illustrates acoustic waveforms, acoustic features, and labels, in accordance with certain embodiments of the present disclosure.

Feature extraction circuit 109 is configured to extract acoustic features from a provided audio signal, for example, the training data or training signal 110 containing target acoustic events, and the audio signal 130 upon which event detection is to be performed. In some embodiments, the extracted acoustic features include short-term Fourier transform (STFT) frames of the audio signal. In some embodiments, the acoustic features may include filter-bank features, mel-frequency cepstral coefficients (MFCC), spectral shape descriptors, or other known acoustic feature measurements, in light of the present disclosure. Example acoustic features 160, extracted from a signal containing target acoustic event data 220, are illustrated in FIG. 3. In some embodiments, the STFT intervals or frame lengths 306 may be on the order of 50 milliseconds (ms).

As can be seen in acoustic features 160, the features characteristics at the beginning of the event are significantly different from those at the middle and end of the event. Thus, by increasing the modelling granularity down to the level of the subparts, the classifier can be trained to better fit the data.

Clustering circuit 102 is configured to perform unsupervised subspace clustering of the extracted features to generate acoustic event subparts 120 which are used by classifier training circuit 104 to train a classifier to recognize targeted acoustic events. The operations of clustering circuit 102 and classifier training circuit 104 will be described in greater detail below, in connection with FIGS. 2 and 3.

In operational mode, the feature extraction circuit 109 is configured to extract features from an audio signal 130 in the same manner in which features were extracted from the training data 110, as described above. Audio signal 130 is typically, though not necessarily, an unknown signal and may or may not contain target acoustic events (e.g., events of interest). The trained classifier 106 is configured to identify acoustic event subparts of the audio signal, based on the extracted acoustic features, and to generate scores 140 associated with those subparts.

Figure 4:
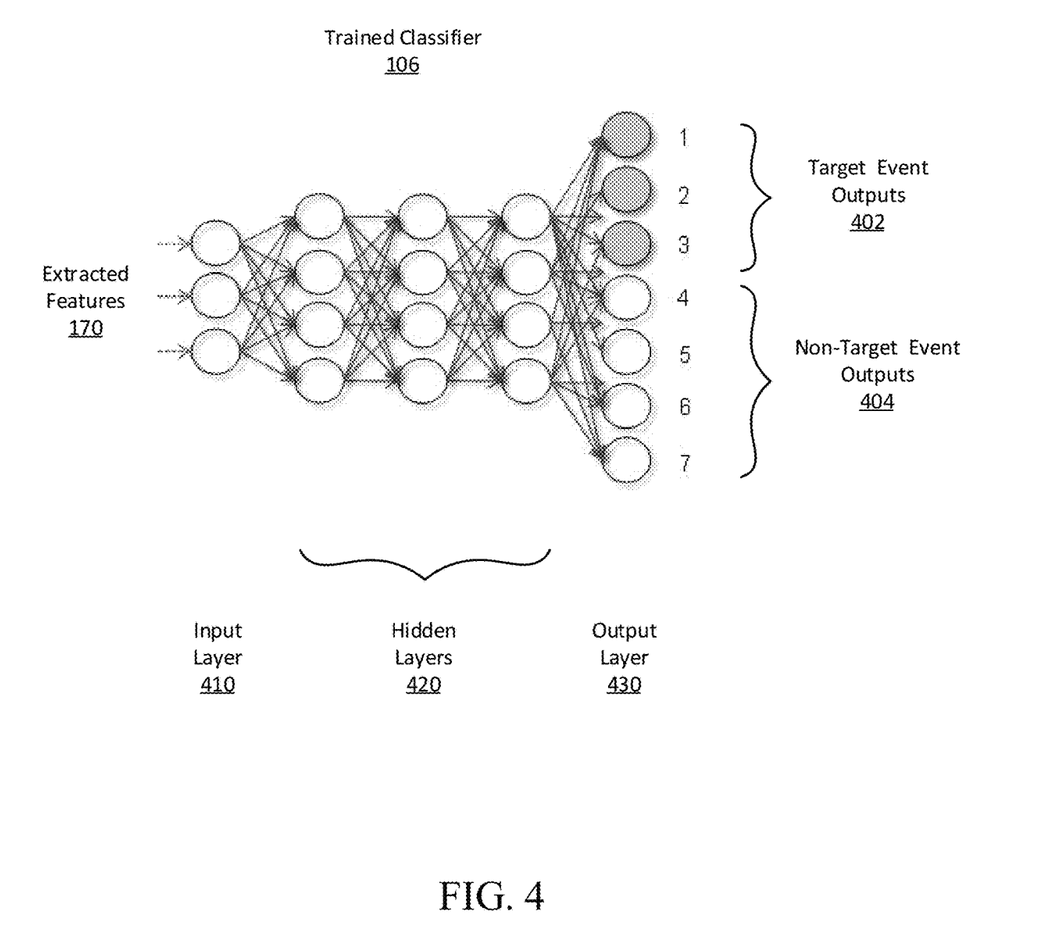
FIG. 4 illustrates inputs and outputs of a trained classifier, configured in accordance with certain embodiments of the present disclosure.

In some embodiments, the classifier circuit is implemented as a deep neural network (DNN), a support vector machine, a decision tree classifier, a k-nearest neighbor classifier, a random forest classifier, a gradient boosting classifier, a logistic regression based classifier, or using other known techniques in light of the present disclosure. FIG. 4 illustrates a deep neural network implementation of the trained classifier 106. The input layer 410 receives the extracted features 170 of the audio signal. These acoustic features are operated on by the nodes of each layer including the hidden layers 420 and ultimately the output layer 430. In this example, each output layer node is associated with one of the target event outputs 402 corresponding to a subpart of a target acoustic event, or to a non-target event output 404 which forms the rejection model. These output nodes generate a label and a score for the classified output from that node. The labels identify the acoustic event subpart. The score may be a relative value on a normalized scale, indicating the confidence of that classified output.

Figure 5:
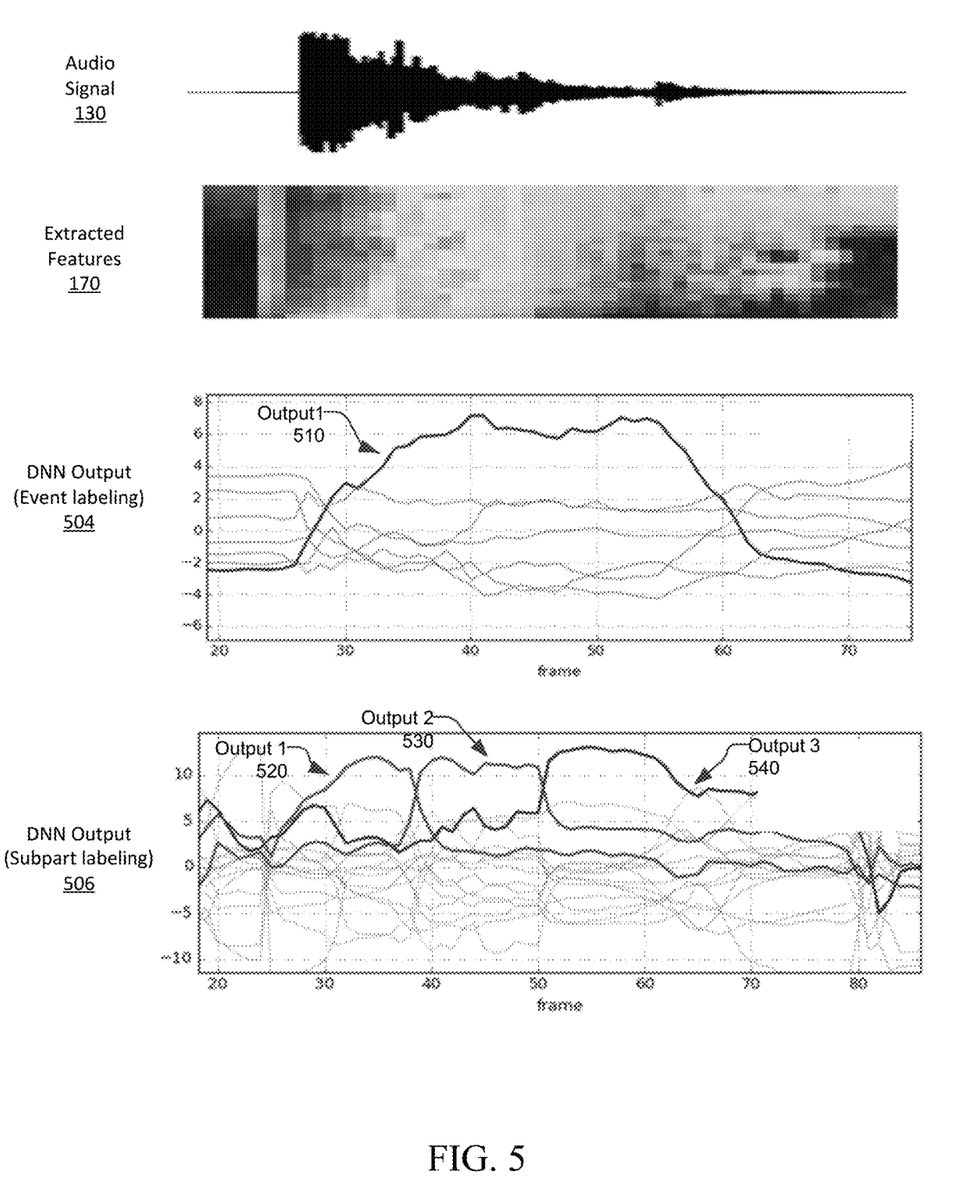
FIG. 5 provides a graphical comparison of event labeling and cluster labeling, in accordance with certain embodiments of the present disclosure.

This is illustrated in FIG. 5, which shows an audio signal 130, extracted acoustic features 170, and the outputs 504, 506 of a DNN including scores and labels. FIG. 5 provides a graphical comparison of event labeling 504 and cluster labeling 506. Plot 504 shows the output of a DNN classifier trained to recognize an entire acoustic event 510 labeled "output 1," with scores on the vertical axis. As can be seen, this classifier, trained on event level labeling, is more sensitive to the middle part of the event and may therefore be likely to confuse the target event with other sounds that have features similar to the middle part, resulting in more false detections.

Plot 506 shows the output of a DNN classifier trained, in accordance with certain embodiments of the present disclosure, to recognize subparts of the acoustic event. The subparts 520, 530, 540 are labeled "output 1," "output 2," and "output 3" respectively, with scores on the vertical axis. For this classifier, a detection is required to have all three distinctive subparts in the correct order, improving the false detection rate.

Sequence decoder circuit 108 is configured to perform sequence decoding of the labeled acoustic event subparts and associated scores, generated by the classifier 106, to detect acoustic events. The sequence decoding is based on a temporal ordering of the acoustic event subparts and a comparison of the associated scores to a selected threshold score value. The decoder is sensitive to the correct sequence of subparts states. Said differently, an acoustic event is considered to be detected when the correct sequence of subparts, with sufficiently high scores, is detected. In some embodiments, the sequence decoder circuit employs one or more of a Weighted Finite-State Transducer, a recurrent neural network (RNN), or a long short-term memory RNN.

Figure 6:
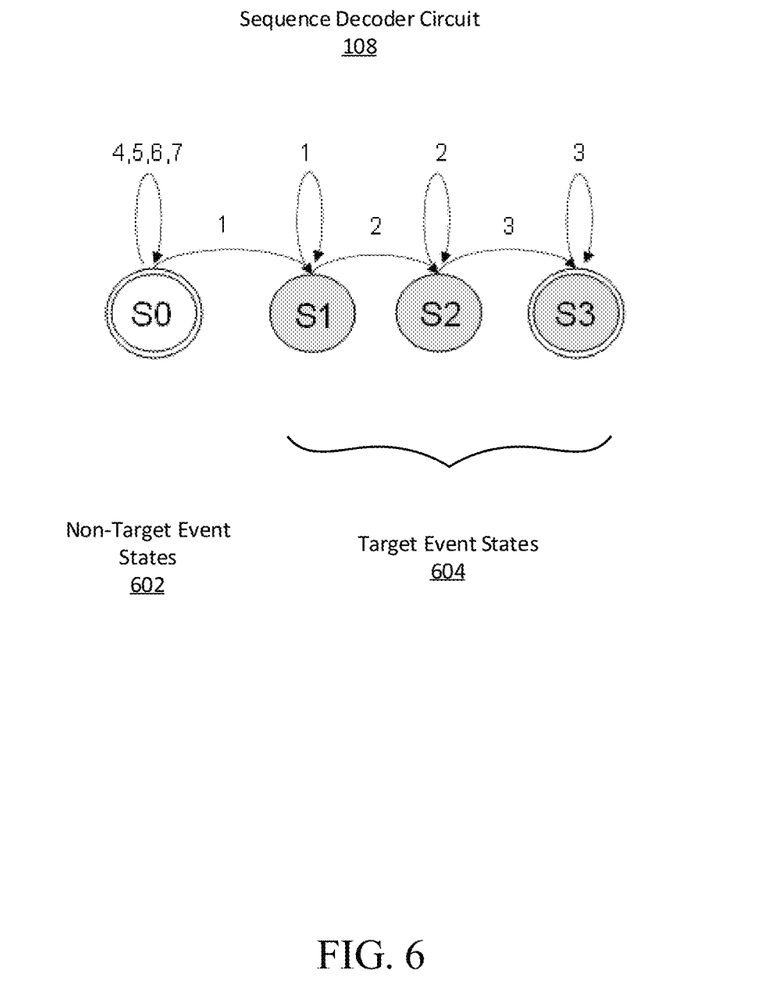
FIG. 6 illustrates the states of a sequence decoder circuit, configured in accordance with certain embodiments of the present disclosure.

FIG. 6 illustrates a state diagram representation of a sequence decoder circuit 108, configured in accordance with certain embodiments of the present disclosure. The decoder can be in either a non-target event state 602 or a target event state 604. In this example, the decoder remains in state zero (S0) while non-target event outputs 4, 5, 6, 7 are generated by the classifier. When target event output 1 is generated, the sequence decoder shifts to state one (S1) and remains there until a different event output is generated. In response to the generation of a target event output 2, the sequence decoder shifts from state one (S1) to state two (S2) and remains there until a different event output is generated. Subsequently, in response to the generation of a target event output 3, the sequence decoder shifts from state two (S2) to state three (S3). An acoustic event may be detected when the sequence decoder circuit has traversed states one through three in the correct order, with satisfactory classifier output scores. In some embodiments, an event detection may also require that the sequence decoder circuit remains in each of the three states for a selected time duration. For example, the durations of each of the subparts of a given acoustic event may be known or anticipated to lie within a specific range of time duration values.

Returning now to FIG. 2, a more detailed block diagram of the clustering circuit 102, configured in accordance with certain embodiments of the present disclosure, is shown. The clustering circuit 102 is employed in the training mode of the acoustic event detection system 100 and operates on acoustic features 160 extracted from training data 110 containing acoustic events. At least some of the training data will contain target data 220 (e.g., acoustic events of interest, to be detected by the classifier). In some embodiments, the training data may also contain non-target data 230, which can improve the training of the classifier to distinguish between target acoustic events and nontarget acoustic events. If non-target data 230 is provided, then a categorization process 202 is performed to provide a label of some suitable type to distinguish between the target data 220 and the non-target data 230. This process can be performed manually, or in an automated fashion, or the categorization information may be included as a component part of a database of acoustic recordings provided, for example, by a third-party.

Figure 2:
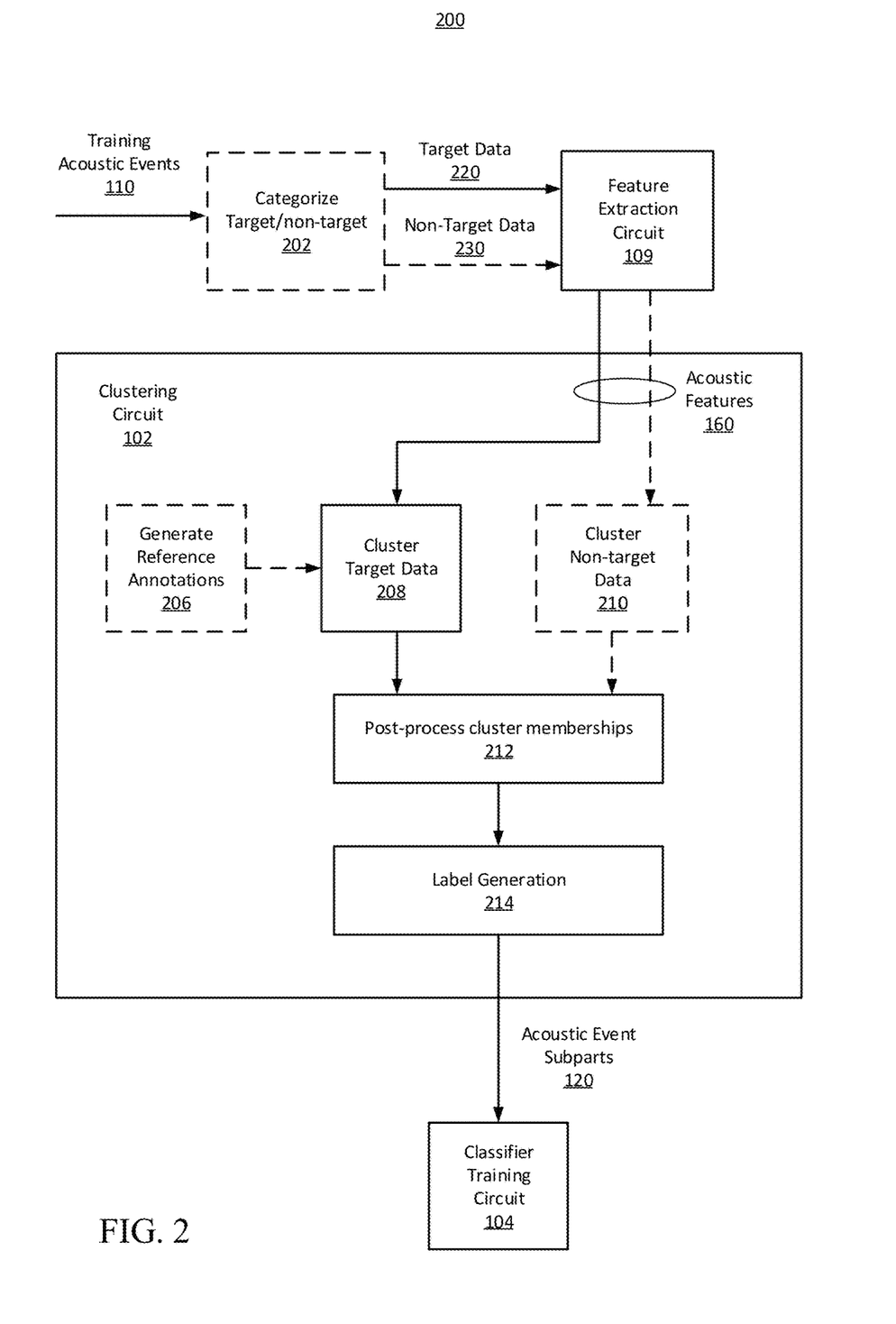
FIG. 2 is a more detailed block diagram of the clustering circuit, configured in accordance with certain embodiments of the present disclosure.

The acoustic features 160 from the target data, and optionally from the non-target data, are clustered at operations 208 and 210 respectively, using an unsupervised subspace clustering. In some embodiments, the unsupervised subspace clustering is implemented as k-means clustering, Gaussian Mixture Model clustering, DenStream clustering, or through other known techniques in light of the present disclosure.

One of the advantages of using unsupervised subspace clustering techniques is that silent portions of the data are clustered into separate clusters from the event subpart clusters. This allows for automated detection of beginning and ending points of the event subparts in the training data, as these event subparts will generally be the only non-silent portions of the training data. In contrast, detection systems that are based on labels for the entire event, rather than subpart clusters, generally require annotated training data to accurately mark the beginning and ending points of the event, which can be a time-consuming and expensive process. Nevertheless, in some embodiments, some portion of the training data may include reference annotations to indicate the locations of the subparts of the target acoustic events, which may improve the efficiency, and aid with the initialization, of the subspace clustering techniques. The generation of these reference annotations is shown at operation 206. In these embodiments, where reference annotations or other a-priori knowledge about the training data is available, semi-supervised subspace clustering techniques may be employed. Semi-supervised (or semi-automatic) subspace clustering techniques may include constrained k-means clustering, seeded k-means clustering, and semi-supervised variants of Gaussian Mixture Model clustering, and DenStream clustering.

In still other embodiments, reference annotations are available for all, or most, of the subparts of the target acoustic events, eliminating the need to perform the subspace clustering operation.

At operation 212 of the clustering circuit, the generated clusters undergo a post-processing operation to reduce noise (e.g., outlying or ambiguous points that may or may not be associated with the cluster). In some embodiments, this may be achieved through median filtering and/or comparisons to clustering results from adjacent frames.

At operation 214 of the clustering circuit, labels are generated for each of the clusters (subparts), for example by associating acoustic features with a cluster index. This is illustrated in FIG. 3 which shows the cluster labels 302 associated with each subpart of the target acoustic event. In this example, the event 304 labeled "glass break" is shown to include three consecutive subparts labeled "Cluster 1," "Cluster 2," and "Cluster 3."

The labeled acoustic event subparts 302 and associated acoustic features 160 are collected for a large number of training acoustic events 110, and are provided to the classifier training circuit 104 to train a classifier to discriminate between the event subparts, using known techniques in light of the present disclosure.

Methodology

Figure 7:
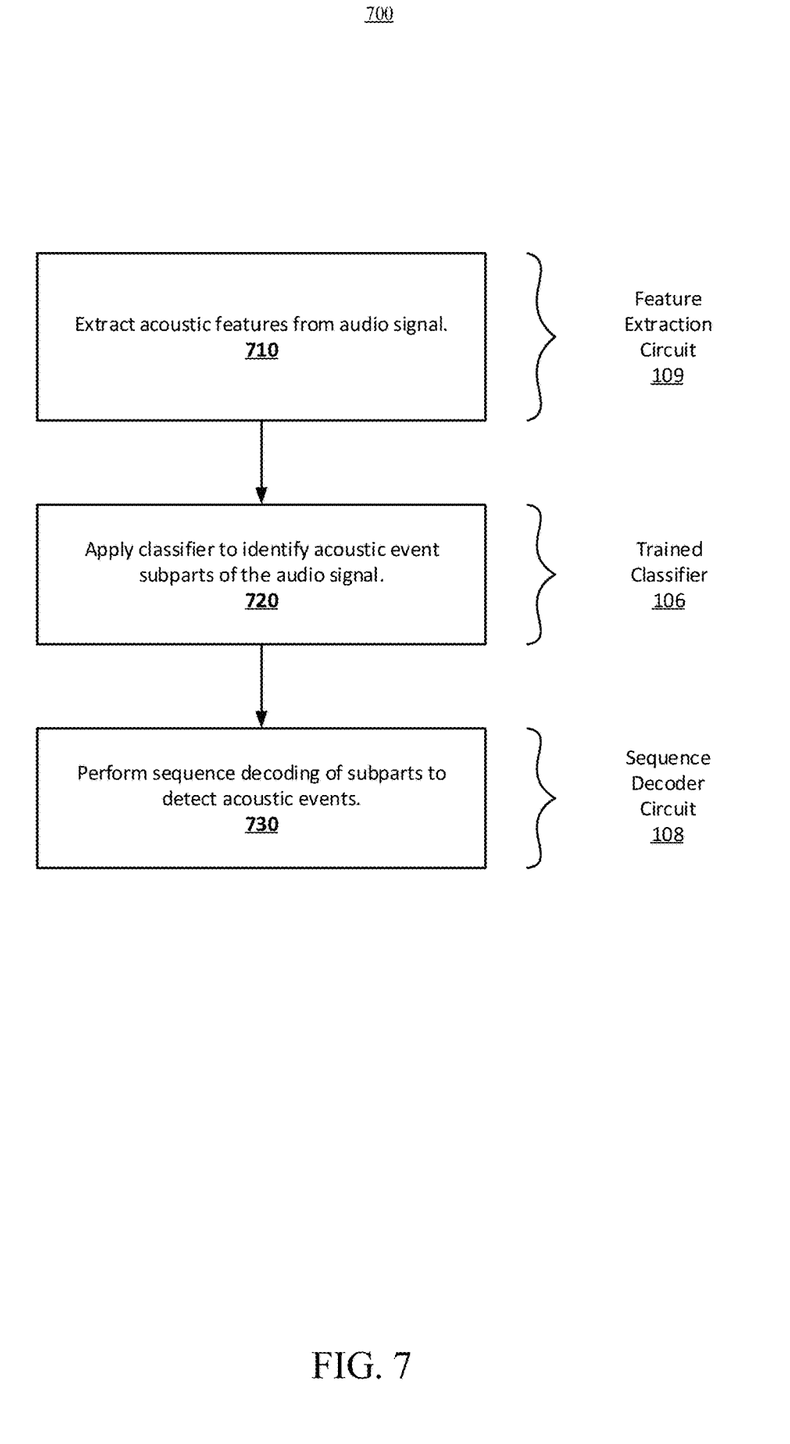
FIG. 7 is a flowchart illustrating a methodology for acoustic event detection, in accordance with certain embodiments of the present disclosure.

FIG. 7 is a flowchart illustrating an example method 700 for acoustic event detection, in accordance with certain embodiments of the present disclosure. As can be seen, the example method includes a number of phases and sub-processes, the sequence of which may vary from one embodiment to another. However, when considered in the aggregate, these phases and sub-processes form a process for acoustic event detection in accordance with certain of the embodiments disclosed herein. These embodiments can be implemented, for example using the system architecture illustrated in FIGS. 1 and 2 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations.

Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in an embodiment, method 700 for acoustic event detection commences by extracting, at operation 710, acoustic features from a received audio signal. In some embodiments, the extracted acoustic features may include short-term Fourier transforms of the audio signal. In some embodiments, the audio signal may be provided by a microphone or retrieved from a database of prerecorded audio signals.

Next, at operation 720, a trained classifier is applied to the extracted acoustic features to identify and label acoustic event subparts of the audio signal and to generate scores associated with the subparts. The subparts may represent, for example, the beginning, middle, and tail end portions of an acoustic event such as a glass break, gun shot, or door slam. In some embodiments, the classifier may be implemented as a deep neural network, a support vector machine, a decision tree classifier, or a k-nearest neighbor classifier.

At operation 730, sequence decoding is performed on the acoustic event subparts and associated scores to detect acoustic events, based on the temporal ordering of the event subparts and the associated scores. In some embodiments, the sequence decoding may be performed by a Weighted Finite-State Transducer, a recurrent neural network (RNN), or a long short-term memory RNN.

Of course, in some embodiments, additional operations may be performed, as previously described in connection with the system. For example, the classifier is trained on acoustic event subparts that are generated through unsupervised subspace clustering techniques applied to training data that includes target acoustic events. In some embodiments, the unsupervised subspace clustering may employ k-means clustering, Gaussian Mixture Model clustering, or DenStream clustering.

Example System

Figure 8:
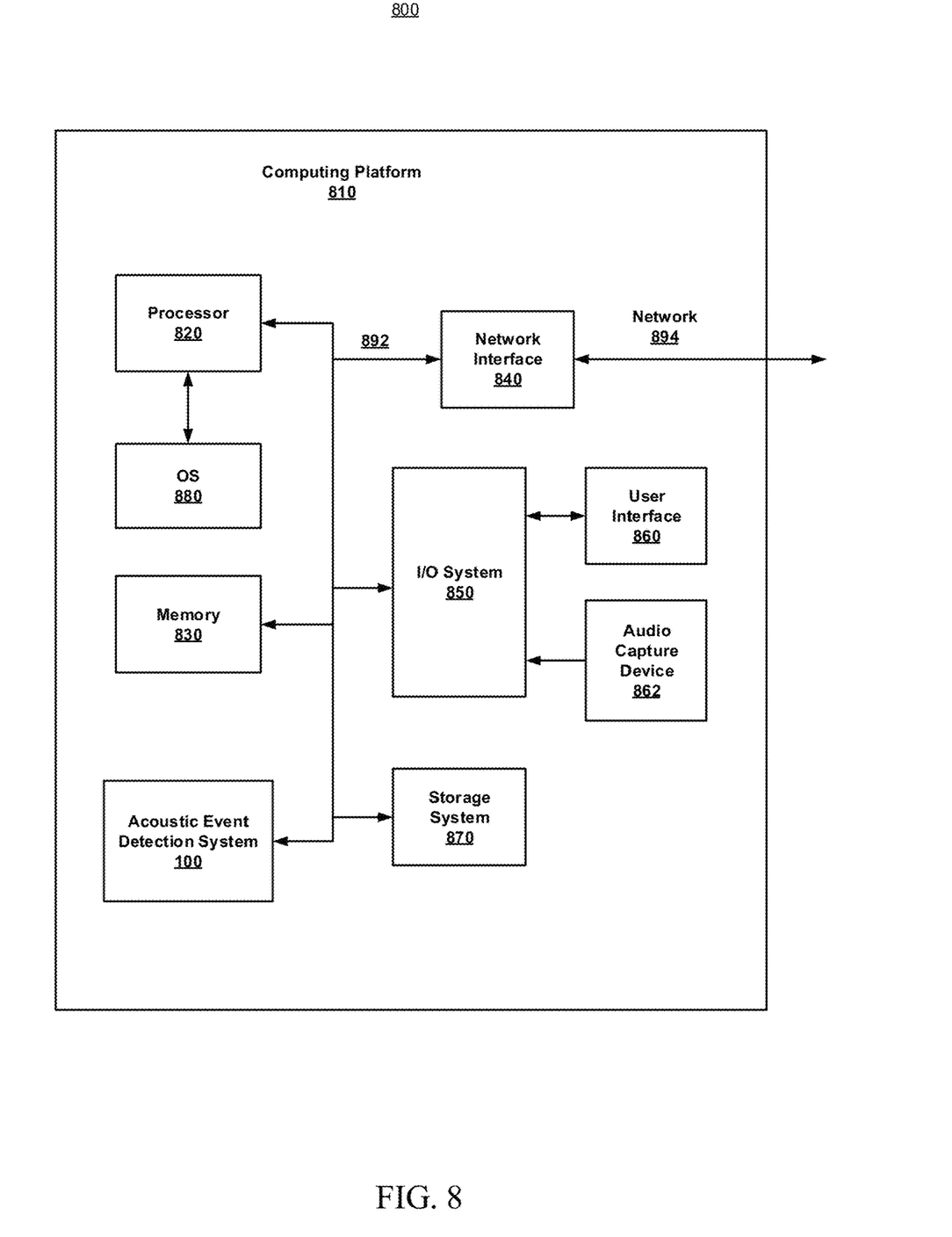
FIG. 8 is a block diagram schematically illustrating a computing platform configured to perform acoustic event detection, in accordance with certain embodiments of the present disclosure.

FIG. 8 illustrates an example system 800 to perform acoustic event detection, configured in accordance with certain embodiments of the present disclosure. In some embodiments, system 800 comprises a computing platform 810 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, platform 810 may comprise any combination of a processor 820, a memory 830, acoustic event detection system 100, a network interface 840, an input/output (I/O) system 850, a user interface 860, an audio capture device 862, and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms, or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with system 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, user interface 860 and audio capture device 862 (e.g., a microphone). User interface 860 may include devices (not shown) such as a display element, touchpad, keyboard, mouse, and speaker, etc. I/O system 850 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 810.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Acoustic event detection system 100 is configured to detect events of interest based on the recognition or identification of subparts of the event that occur in an expected temporal order, as described previously. Acoustic event detection system 100 may include any or all of the circuits/components illustrated in FIGS. 1 and 2, as described above. These components can be implemented or otherwise used in conjunction with a variety of suitable software and/or hardware that is coupled to or that otherwise forms a part of platform 810. These components can additionally or alternatively be implemented or otherwise used in conjunction with user I/O devices that are capable of providing information to, and receiving information and commands from, a user.

In some embodiments, these circuits may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the acoustic event detection methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other acoustic-based software applications, such as, for example, security, surveillance, smart-home management, robotic, and Internet of Things (IoT) applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for detecting acoustic events, the method comprising: extracting, by a processor-based system, one or more acoustic features from an audio signal; applying, by the processor-based system, a trained classifier to the one or more extracted acoustic features to identify acoustic event subparts of the audio signal and to generate scores associated with the subparts; and performing, by the processor-based system, sequence decoding of the acoustic event subparts and associated scores to detect acoustic events.

Example 2 includes the subject matter of Example 1, wherein the sequence decoding is based on a temporal ordering of the acoustic event subparts and a comparison of the associated scores to a threshold score a value.

Example 3 includes the subject matter of Examples 1 or 2, further comprising training the classifier on acoustic event subparts generated through subspace clustering applied to training data, the training data including target acoustic events.

Example 4 includes the subject matter of any of Examples 1-3, wherein the subspace clustering is unsupervised subspace clustering based on at least one of k-means clustering, Gaussian Mixture Model clustering, and DenStream clustering.

Example 5 includes the subject matter of any of Examples 1-4, further comprising generating reference annotations for at least a subset of the training data including target acoustic events, the reference annotations to indicate the subparts of the target acoustic events, and wherein the subspace clustering is semi-supervised subspace clustering based on at least one of constrained k-means clustering, seeded k-means clustering, and semi-supervised variants of Gaussian Mixture Model clustering, and DenStream clustering.

Example 6 includes the subject matter of any of Examples 1-5, wherein the sequence decoding is based on least one of a Weighted Finite-State Transducer, a recurrent neural network (RNN), and a long short-term memory RNN.

Example 7 includes the subject matter of any of Examples 1-6, wherein the one or more extracted acoustic features include at least one of a short-term Fourier transform representative of at least part of the audio signal, filter-bank features representative of at least part of the audio signal, mel-frequency cepstral coefficients representative of at least part of the audio signal, and spectral shape descriptors representative of at least part of the audio signal.

Example 8 includes the subject matter of any of Examples 1-7, wherein the classifier is at least one of a deep neural network, a support vector machine, a decision tree classifier, a k-nearest neighbor classifier, a random forest classifier, a gradient boosting classifier, and a logistic regression based classifier.

Example 9 is a system for acoustic event detection, the system comprising: a feature extraction circuit to extract acoustic features from an audio signal; a classifier circuit to identify acoustic event subparts of the audio signal, based on the extracted acoustic features, and to generate scores associated with the subparts; and a sequence decoder circuit to perform sequence decoding of the acoustic event subparts and associated scores to detect acoustic events.

Example 10 includes the subject matter of Example 9, wherein the sequence decoding is based on a temporal ordering of the acoustic event subparts and a comparison of the associated scores to a threshold score a value.

Example 11 includes the subject matter of Examples 9 or 10, further comprising a classifier training circuit to train the classifier on acoustic event subparts generated through subspace clustering applied to training data, the training data including target acoustic events.

Example 12 includes the subject matter of any of Examples 9-11, wherein the subspace clustering is unsupervised subspace clustering based on at least one of k-means clustering, Gaussian Mixture Model clustering, and DenStream clustering.

Example 13 includes the subject matter of any of Examples 9-12, wherein at least a subset of the training data includes target acoustic events and associated reference annotations, the reference annotations to indicate the subparts of the target acoustic events, and wherein the subspace clustering is semi-supervised subspace clustering based on at least one of constrained k-means clustering, seeded k-means clustering, and semi-supervised variants of Gaussian Mixture Model clustering, and DenStream clustering.

Example 14 includes the subject matter of any of Examples 9-13, wherein the sequence decoder circuit employs at least one of a Weighted Finite-State Transducer, a recurrent neural network (RNN), and a long short-term memory RNN.

Example 15 includes the subject matter of any of Examples 9-14, wherein the extracted acoustic features include at least one of a short-term Fourier transform representative of at least part of the audio signal, filter-bank features representative of at least part of the audio signal, mel-frequency cepstral coefficients representative of at least part of the audio signal, and spectral shape descriptors representative of at least part of the audio signal.

Example 16 includes the subject matter of any of Examples 9-15, wherein the classifier circuit is at least one of a deep neural network, a support vector machine, a decision tree classifier, a k-nearest neighbor classifier, a random forest classifier, a gradient boosting classifier, and a logistic regression based classifier.

Example 17 is at least one non-transitory computer readable storage medium having instructions encoded thereon that, when executed by one or more processors, result in the following operations for detecting acoustic events, the operations comprising: extracting one or more acoustic features from an audio signal; applying a trained classifier to the one or more extracted acoustic features to identify acoustic event subparts of the audio signal and to generate scores associated with the subparts; and performing sequence decoding of the acoustic event subparts and associated scores to detect acoustic events.

Example 18 includes the subject matter of Example 17, wherein the sequence decoding is based on a temporal ordering of the acoustic event subparts and a comparison of the associated scores to a threshold score a value.

Example 19 includes the subject matter of Examples 17 or 18, the operations further comprising training the classifier on acoustic event subparts generated through subspace clustering applied to training data, the training data including target acoustic events.

Example 20 includes the subject matter of any of Examples 17-19, wherein the subspace clustering is unsupervised subspace clustering based on at least one of k-means clustering, Gaussian Mixture Model clustering, and DenStream clustering.

Example 21 includes the subject matter of any of Examples 17-20, the operations further comprising generating reference annotations for at least a subset of the training data including target acoustic events, the reference annotations to indicate the subparts of the target acoustic events, and wherein the subspace clustering is semi-supervised subspace clustering based on at least one of constrained k-means clustering, seeded k-means clustering, and semi-supervised variants of Gaussian Mixture Model clustering, and DenStream clustering.

Example 22 includes the subject matter of any of Examples 17-21, wherein the sequence decoding is based on least one of a Weighted Finite-State Transducer, a recurrent neural network (RNN), and a long short-term memory RNN.

Example 23 includes the subject matter of any of Examples 17-22, wherein the one or more extracted acoustic features include at least one of a short-term Fourier transform representative of at least part of the audio signal, filter-bank features representative of at least part of the audio signal, mel-frequency cepstral coefficients representative of at least part of the audio signal, and spectral shape descriptors representative of at least part of the audio signal.

Example 24 includes the subject matter of any of Examples 17-23, wherein the classifier is at least one of a deep neural network, a support vector machine, a decision tree classifier, a k-nearest neighbor classifier, a random forest classifier, a gradient boosting classifier, and a logistic regression based classifier.

Example 25 is a system for detecting acoustic events, the system comprising: means for extracting one or more acoustic features from an audio signal; means for applying a trained classifier to the one or more extracted acoustic features to identify acoustic event subparts of the audio signal and to generate scores associated with the subparts; and means for performing sequence decoding of the acoustic event subparts and associated scores to detect acoustic events.

Example 26 includes the subject matter of Example 25, wherein the sequence decoding is based on a temporal ordering of the acoustic event subparts and a comparison of the associated scores to a threshold score a value.

Example 27 includes the subject matter of Examples 25 or 26, further comprising means for training the classifier on acoustic event subparts generated through subspace clustering applied to training data, the training data including target acoustic events.

Example 28 includes the subject matter of any of Examples 25-27, wherein the subspace clustering is unsupervised subspace clustering based on at least one of k-means clustering, Gaussian Mixture Model clustering, and DenStream clustering.

Example 29 includes the subject matter of any of Examples 25-28, further comprising means for generating reference annotations for at least a subset of the training data including target acoustic events, the reference annotations to indicate the subparts of the target acoustic events, and wherein the subspace clustering is semi-supervised subspace clustering based on at least one of constrained k-means clustering, seeded k-means clustering, and semi-supervised variants of Gaussian Mixture Model clustering, and DenStream clustering.

Example 30 includes the subject matter of any of Examples 25-29, wherein the sequence decoding is based on least one of a Weighted Finite-State Transducer, a recurrent neural network (RNN), and a long short-term memory RNN.

Example 31 includes the subject matter of any of Examples 25-30, wherein the one or more extracted acoustic features include at least one of a short-term Fourier transform representative of at least part of the audio signal, filter-bank features representative of at least part of the audio signal, mel-frequency cepstral coefficients representative of at least part of the audio signal, and spectral shape descriptors representative of at least part of the audio signal.

Example 32 includes the subject matter of any of Examples 25-31, wherein the classifier is at least one of a deep neural network, a support vector machine, a decision tree classifier, a k-nearest neighbor classifier, a random forest classifier, a gradient boosting classifier, and a logistic regression based classifier.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one non-transitory computer readable storage medium having instructions encoded thereon that, when executed by one or more processors, result in the following operations for detecting acoustic events, the operations comprising:
    extracting one or more acoustic features from an audio signal;
    applying a trained classifier to the one or more extracted acoustic features to identify acoustic event subparts of the audio signal and to generate output scores associated with at least the one or more acoustic event subparts; and
    performing sequence decoding of the acoustic event subparts and associated scores; and
    detecting a first acoustic event in response to receiving a series of target event output scores in a first order and traversing through a series of sequence decoder circuit states in the first order corresponding to each of the series of target event output scores received, wherein the sequence decoder circuit is to remain in at least one of the plurality of states over a selected time duration.

2. The computer readable storage medium of claim 1, wherein the sequence decoding is based on a temporal ordering of the acoustic event subparts and a comparison of the associated output scores to a threshold score a value.

3. The computer readable storage medium of claim 1, the operations further comprising training the trained classifier on acoustic event subparts generated through subspace clustering applied to training data, the training data including target acoustic events.

4. The computer readable storage medium of claim 3, wherein the subspace clustering is unsupervised subspace clustering based on at least one of k-means clustering, Gaussian Mixture Model clustering, and DenStream clustering.

5. The computer readable storage medium of claim 3, the operations further comprising generating reference annotations for at least a subset of the training data including target acoustic events, the reference annotations to indicate the subparts of the target acoustic events, and wherein the subspace clustering is semi-supervised subspace clustering based on at least one of constrained k-means clustering, seeded k-means clustering, and semi-supervised variants of Gaussian Mixture Model clustering, and DenStream clustering.

6. The computer readable storage medium of claim 1, wherein the sequence decoding is based on least one of a Weighted Finite-State Transducer, a recurrent neural network (RNN), and a long short-term memory RNN.

7. The computer readable storage medium of claim 1, wherein the one or more extracted acoustic features include at least one of a short-term Fourier transform representative of at least part of the audio signal, filter-bank features representative of at least part of the audio signal, mel-frequency cepstral coefficients representative of at least part of the audio signal, and spectral shape descriptors representative of at least part of the audio signal.

8. The computer readable storage medium of claim 1, wherein the trained classifier is at least one of a deep neural network, a support vector machine, a decision tree classifier, a k-nearest neighbor classifier, a random forest classifier, a gradient boosting classifier, and a logistic regression based classifier.

* * * * *